US006626448B2

(12) United States Patent
Miles

(10) Patent No.: US 6,626,448 B2
(45) Date of Patent: Sep. 30, 2003

(54) HEEL GUARD FOR USE WITH MOTORCYCLES

(76) Inventor: Carl F. Miles, P.O. Box 1, Wisdom, MT (US) 59761

( * ) Notice: Subject to any disclaimer, the term of this patent is extended or adjusted under 35 U.S.C. 154(b) by 88 days.

(21) Appl. No.: 10/036,192

(22) Filed: Dec. 28, 2001

(65) Prior Publication Data
US 2003/0121707 A1 Jul. 3, 2003

(51) Int. Cl.$^7$ ................................................ G05G 1/18
(52) U.S. Cl. ............................... 280/291; 280/304.4
(58) Field of Search ............................ 280/291, 304.3, 280/304.4, 748; 180/90.6, 219; 74/564, 563, 594.6; 296/75

(56) References Cited

U.S. PATENT DOCUMENTS

| 3,756,623 A | * | 9/1973 | Whittler | 280/304.3 |
|---|---|---|---|---|
| 4,023,821 A | * | 5/1977 | Eiland | 280/291 |
| 4,451,057 A | * | 5/1984 | Lawson | 280/291 |
| 4,728,121 A | | 3/1988 | Graves | |
| 4,802,684 A | * | 2/1989 | Bennett et al. | 280/291 |
| 4,852,900 A | | 8/1989 | Nahachewski | |
| D395,024 S | | 6/1998 | Baratti | |
| 6,179,313 B1 | | 1/2001 | Christensen | |

* cited by examiner

Primary Examiner—Lesley D. Morris
Assistant Examiner—Matthew Luby
(74) Attorney, Agent, or Firm—Richard C. Conover

(57) ABSTRACT

A motorcycle exhaust pipe protector for use with a motorcycle having an exhaust pipe running adjacent an operator's footrest. The protector includes an elongate rod which is shaped to have a bent fore portion bent toward the motorcycle, and a bent aft portion bent away from the motorcycle in a lateral direction substantially orthogonal to the fore-and-aft direction. The bent aft portion is positioned directly behind the footrest. Further, a bracket is provided for mounting the rod to the footrest at a position between the footrest and the motorcycle, and at an elevation above the footrest.

7 Claims, 3 Drawing Sheets

HEEL GUARD FOR USE WITH MOTORCYCLES

BACKGROUND OF THE INVENTION

The present invention relates to a device for preventing the foot of a motorcycle user from touching the motorcycle exhaust pipe.

Motorcycles having gasoline engines generally have the engines located at a forward position on the motorcycle underneath an operator's seat. The operator rests his feet on a footboard or foot peg positioned on each side of the motorcycle. The engine exhaust pipes extend along the side of the motorcycle to the rear thereof. Generally, an exhaust pipe extends along the inner side of the footboard or foot peg and then extends to the rear behind the footboard or foot peg. The exhaust pipe is commonly provided with a cover or a heat shield which extends longitudinally along with the pipe. As the exhaust pipe becomes hot, this heat shield also becomes hot.

When motorcycles are being driven by an operator, the operator places his feet either on footboards or foot pegs attached to the frame of the motorcycle in close proximity to the exhaust pipe. This exhaust pipe becomes extremely hot, and oftentimes an operator unintentionally positions his foot against this exhaust pipe causing the operator's clothing, footwear or even legs to be burned. Further, since the exhaust pipe generally runs beneath and behind the footboard or foot peg, a user may unintentionally slide his heel onto the hot exhaust pipe or shield, which again may cause burning.

The present invention relates to a device for protecting the foot of a user from engaging the exhaust pipe when using a motorcycle.

Heat shields for use with motorcycles are known. For example, U.S. Pat. No. 6,179,313 to Christensen shows a motorcycle exhaust pipe heat shield having a planar configuration and mounted between a footrest and the exhaust pipe. However, these shields are cumbersome to use and do not act to prevent the heel of the operator from engaging the exhaust pipe when using a motorcycle.

SUMMARY OF INVENTION

A motorcycle exhaust pipe protector for use with a motorcycle having an exhaust pipe running adjacent an operator's footrest. The protector includes an elongate rod which is shaped to have a bent fore portion bent toward the motorcycle, and a bent aft portion bent away from the motorcycle in a lateral direction substantially orthogonal to the fore-and-aft direction. The bent aft portion is positioned directly behind the footrest. Further, a bracket is provided for mounting the rod to the footrest at a position between the footrest and the motorcycle, and at an elevation above the footrest.

DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
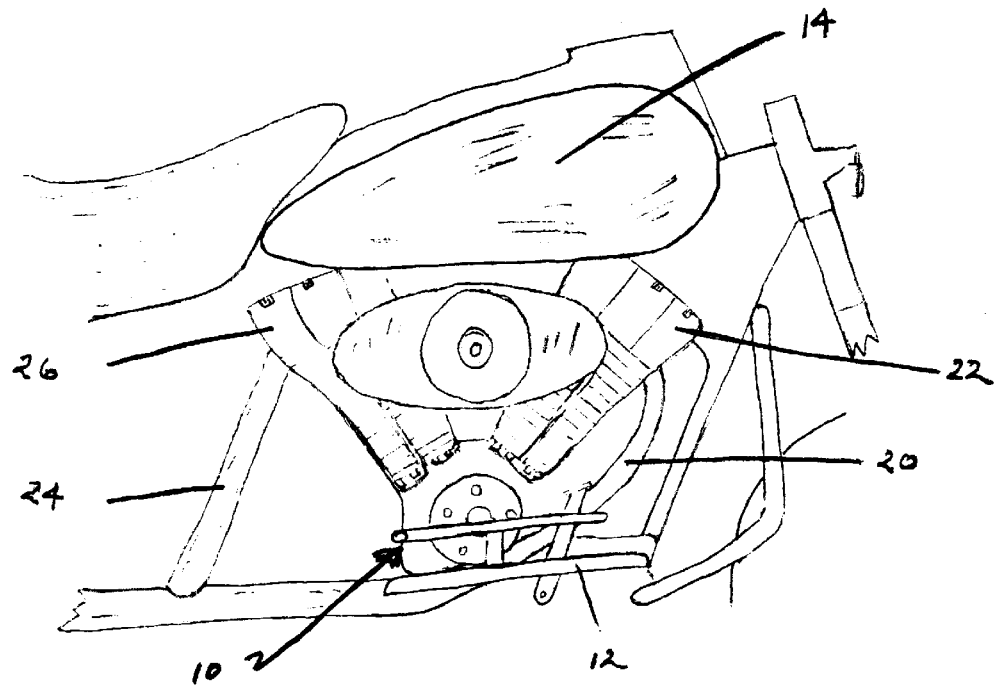
FIG. 1 is a right-side elevational view of a fragment of a conventional motorcycle with a heel guard according to the present invention installed.
Figure 2:
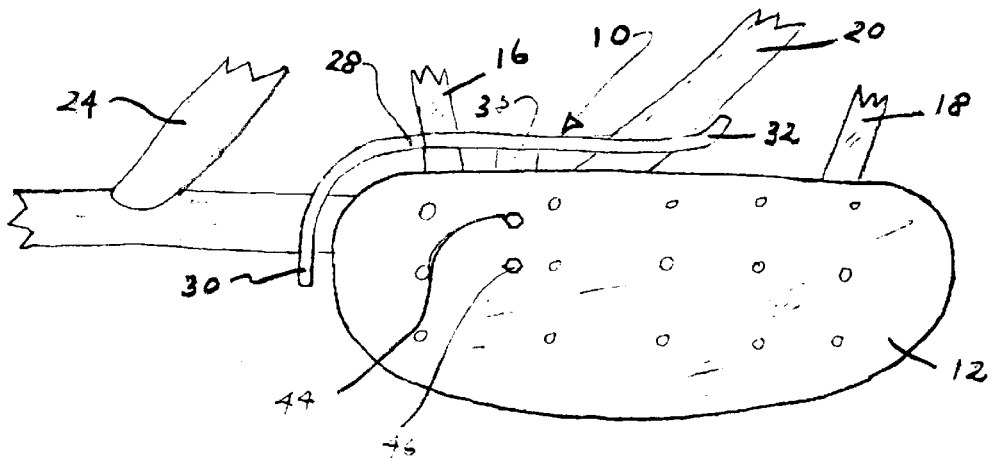
FIG. 2 is a top plan view of a footboard with the protector shown in FIG. 1 installed.

A first embodiment of the present invention 10 is shown in FIGS. 1–5. As shown in FIG. 1, the protector 10 is mounted to a footboard 12 which is mounted to a motorcycle 14. The footboard is mounted to the motorcycle 14 with support arms 16 and 18, as shown in FIG. 2. The motorcycle has a first exhaust pipe 20 exhausting one of the cylinders 22 of the motorcycle 14. Further, a second exhaust pipe 24 exhausts a second cylinder 26 of the motorcycle 14, as shown in FIG. 1. As shown in FIG. 2, the exhaust pipe 20 extends along the side and beneath the footboard 12 and extends rearwardly from the footboard 12 in an aft direction with respect to the motorcycle.

Figure 3:
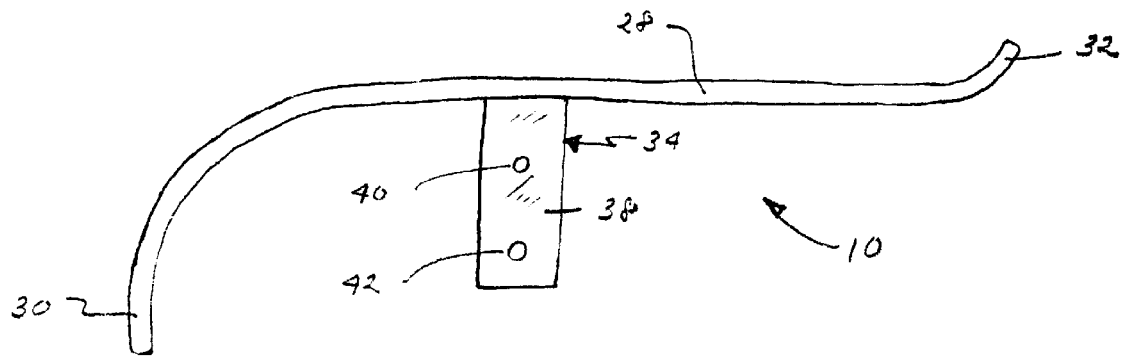
FIG. 3 is a top plan view of the protector shown in FIG. 1 removed from the footboard.
Figure 4:
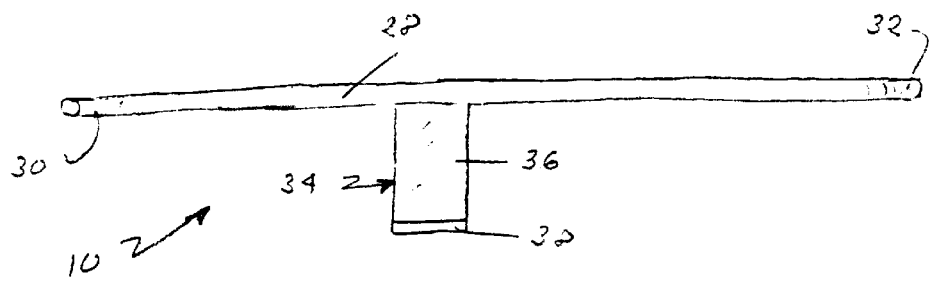
FIG. 4 is a front elevational view of the protector shown in FIG. 3.
Figure 5:
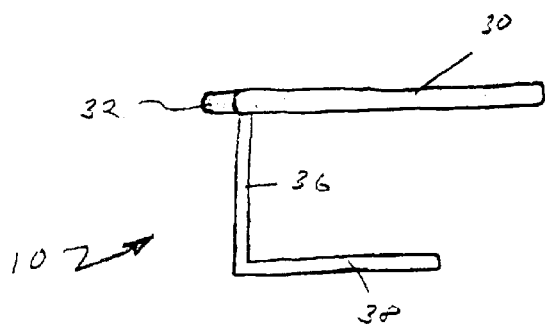
FIG. 5 is a left-side elevational view of the protector shown in FIG. 3.

The protector device is shown in detail in FIGS. 3–5. The protector includes a protector rod 28 which has a bent heel portion 30 which extends toward the motorcycle body, and further, a bent fore portion 32 which extends generally away from the motorcycle. An angle bracket 34 is provided having a pair of leg members 36 and 38 which are joined together along one edge in an orthogonal relation, as shown in FIG. 5. The free end of leg 36 is secured, as by welding, to the rod 28. The leg 38 is provided with a pair of bolt holes 40 and 42, as shown in FIG. 3. Bolts 44 and 46 are inserted in bolt holes 42 and 40, respectively. The bolts are inserted through holes (not shown) provided in footboard 12 and nuts are threaded on the bolts to secure the protector 10 to the footboard 12.

Figure 6:
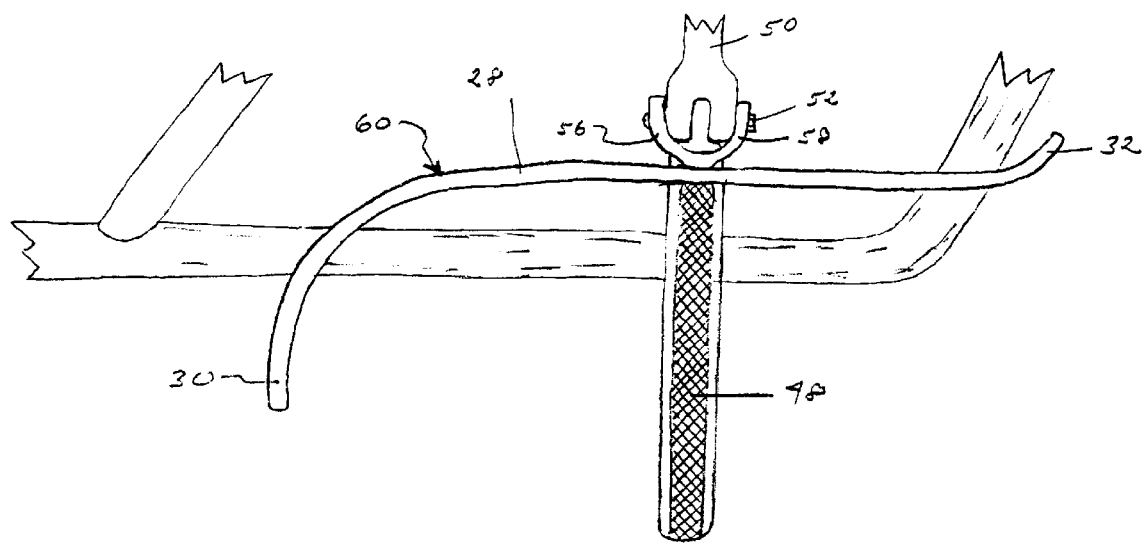
FIG. 6 is a top plan view of a protector according to the present invention mounted to a foot peg.
Figure 7:
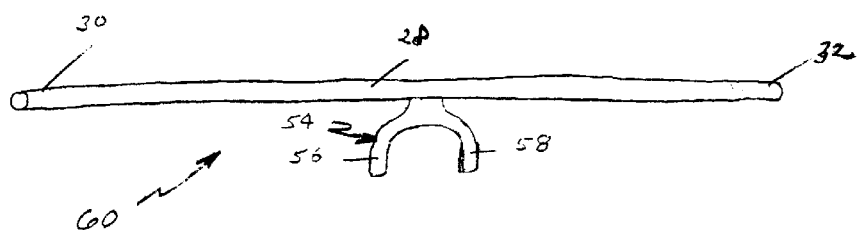
FIG. 7 is a front elevational view of the protector shown in FIG. 6.

A second embodiment 60 of a heel protector according to the present invention is shown in FIGS. 6 and 7. Elements common with the first embodiment are labeled with the same element numbers. This second embodiment 60 is used with a foot peg 48 which is attached to a motorcycle 14 with a support arm 50 in a conventional manner. The foot peg 48 is secured to the support arm 50 with a bolt 52. The second embodiment 60, separated from the foot peg 48, is shown in FIG. 7. The mounting bracket 54 has a pair of spaced-apart legs 56 and 58. A hole, not shown, extends through leg 56 adjacent a free end thereof, and a coaxially aligned hole (not shown) is provided in leg 58 adjacent a free end of leg 58. The protector 60 is mounted to the foot peg 48 by inserting the bolt 52 through leg 58 of the mounting bracket 54 and then through the support arm 50 and foot peg 48, as shown in FIG. 6, and then through the hole in the leg 56. A nut is threaded onto bolt 52 to hold the components together.

The mounting bracket 54 is welded to rod 28 at a position so that when the protector 60 is mounted to foot peg 48, the distance between heel portion 30 and foot peg 48 is sized to prevent a heel of a user from slipping down and between heel portion 30 and foot peg 48.

In using the present invention, a motorcycle operator places his foot on the footboard 12 or foot peg 48 whichever is used with the particular motorcycle. The bent fore portion 32 of rod 28 guides the foot along rod. 28 until the heel of the user abuts the bent heel portion 30. The rod 28 prevents the user's foot from resting in contact with exhaust pipe 20 and the heel portion 30 prevents the user's foot from sliding in the aft direction and onto the exhaust pipe 20 extending beneath the footboard 12 or foot peg 48.

While the fundamental novel features of the invention have been shown and described, it should be understood that various substitutions, modifications, and variations may be made by those skilled in the art, without departing from the spirit or scope of the invention. Accordingly, all such modifications or variations are included in the scope of the invention as defined by the following claims.

I claim:

1. A motorcycle and exhaust pipe protector for an operator of a motorcycle comprising:
    a motorcycle which is moveable in fore-and-aft directions;
    an operator footrest mounted to the motorcycle and extending in a lateral direction away from the motorcycle;
    an engine exhaust pipe on said motorcycle extending adjacent the footrest further extending in the aft direction behind the footrest;
    an elongate rod;
    a bracket for mounting the rod to the footrest at a position between the footrest and the motorcycle and at an elevation above the footrest;
    the rod positioned to extend longitudinally in the fore-and-aft direction;
    the rod having a bent aft portion bent away from the motorcycle in a lateral direction substantially orthogonal to the fore-and-aft direction; and
    the bent aft portion positioned directly aft of the footrest.

2. The protector according to claim 1 wherein the rod further includes a bent fore portion bent toward the motorcycle.

3. The protector according to claim 1 wherein the footrest includes a lateral dimension and the bent aft portion is sized to extend a portion of the length of the lateral dimension.

4. A motorcycle and exhaust pipe protector for an operator of a motorcycle comprising:
    a motorcycle which is moveable in fore-and-aft directions;
    an operator footboard mounted to the motorcycle and extending in a lateral direction away from the motorcycle;
    an engine exhaust pipe on said motorcycle extending adjacent the footboard further extending in the aft direction behind the footrest;
    an elongate rod;
    a bracket for mounting the rod to the footboard at a position between the footboard and the motorcycle and at an elevation above the footboard;
    the bracket having two leg portions joined together in an orthogonal relation, with the free end of one leg secured to the rod and the free end of the second leg attached to the footboard;
    the rod positioned to extend longitudinally in the fore-and-aft direction;
    the rod having a bent aft portion bent away from the motorcycle in a lateral direction substantially orthogonal to the fore-and-aft direction; and
    the bent aft portion positioned directly aft of the footboard.

5. The protector according to claim 4 wherein the rod further includes a bent fore portion bent toward the motorcycle.

6. A motorcycle and exhaust pipe protector for an operator of a motorcycle comprising:
    a motorcycle which is moveable in fore-and-aft directions;
    an operator foot peg mounted to the motorcycle and extending in a lateral direction away from the motorcycle;
    an engine exhaust pipe on said motorcycle extending adjacent the foot peg further extending in the aft direction behind the foot peg;
    an elongate rod;
    a bracket for mounting the rod to the foot peg at a position between the foot peg and the motorcycle and at an elevation above the foot peg;
    the rod positioned to extend longitudinally in the fore-and-aft direction;
    the rod having a bent aft portion bent away from the motorcycle in a lateral direction substantially orthogonal to the fore-and-aft direction; and
    the bent aft portion positioned directly aft of the foot peg.

7. The protector according to claim 6 wherein the rod further includes a bent fore portion bent toward the motorcycle.

* * * * *